United States Patent Office 3,786,141
Patented Jan. 15, 1974

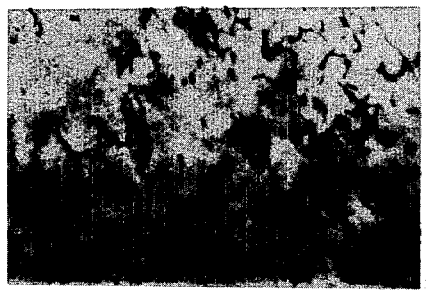

3,786,141
METHOD OF PRODUCTION OF ANTI-TUMOR SUBSTANCES
Haruki Ogawa, Fuchu, Akihiro Yamamoto, Higashimurayama, Yutaka Sugawara, Iruma-gun, and Shigeo Suzuki and Yoshio Takagaki, Kodaira, Japan, assignors to Chugai Seiyaku Kabushiki Kaisha, Tokyo, Japan
Filed Sept. 30, 1971, Ser. No. 185,112
Claims priority, application Japan, Sept. 30, 1970, 45/85,006
Int. Cl. A01n 15/00
U.S. Cl. 424—95
10 Claims

ABSTRACT OF THE DISCLOSURE

A water-insoluble anti-tumor active substance is prepared from the living cells of hemolytic streptococci by lysing the cells of hemolytic streptococci with a lytic enzyme and collecting a water-insoluble fraction which corresponds to a protoplast membrane fraction of the cells. The preparation of the anti-tumor substance is far superior in the anti-tumor activity to that of water-soluble fraction and has less inflammation-, fever- and pain-causing properties than any ones of prior art.

---

The present invention relates to anti-tumor substances, and more particularly, it relates to water-insoluble anti-tumor substances prepared from the lysed cells of hemolytic streptococci and the production thereof.

The living cells of hemolytic streptococci have a remarkable destructive action on tumor cells. It is known in Japanese patent publication No. 6,690/1968 that a practicable anti-tumor preparation (abbreviated to PCB-45) is obtained by incubating the cells of hemolytic streptococci suspended in Bernheimer's basal medium (abbreviated hereinafter to BBM) containing penicillin in a comparatively high concentration at a temperature of about 37° C. for about 20 minutes, and then subjecting the cells suspension to heat-treatment at about 45° C. for about 30 minutes thereby decreasing the toxicity but considerably increasing the activity on tumor cells. British Pat. No. 1,153,113 granted to the present applicant discloses that the same result is obtained by the same procedures except the use of cephalosporin C or cycloserine instead of penicillin. The anti-tumor preparation prepared by the use of cephalosporin C is hereinafter referred to as CEB-45, and that prepared by the use of cycloserine as CYB-45.

While the preparations obtained by these methods are superior in their anti-tumor activity, they are not desirable in viewpoint of the form of preparation. That is, they have such drawbacks that they have an inflammation-causing property and give a patient a temporary fever and a pain in the administered portion, which drawbacks come from various components contained in the cells, especially in cytoplasm and cell membrane.

On the other hand, there have been reported many processes for the production of preparation comprising anti-tumor substances as a water-soluble fraction from the cells of hemolytic streptococci. It is known that such a preparation is produced by extracting the cells with water or an aqueous solution of an inorganic salt, and adding an organic solvent to the extract to precipitate anti-tumor substances (Japanese patent publication No. 1,647/1963); by lysing the cells with a lytic enzyme, such as lysozyme, cellulase or protease, and obtaining the water-soluble fraction as an active component (British Pat. No. 1,163,865); and by salting out the extract with ammonium sulfate to obtain an active fraction as the precipitate (an oral report in October 1969, the 28th Meeting of Japan Cancer Society).

All of the anti-tumor preparations prepared according to the above processes come from water-soluble fractions of the cells of the Streptococci, and their anti-tumor activity is not sufficient as compared with that of PCB-45 which is a preparation of streptococcal cells. Further, these preparations contain also many components other than anti-tumor substances, which may cause an inflammation fever or pain.

An object of this invention is to provide a new type of water-insoluble anti-tumor preparation.

Another object of this invention is to provide an anti-tumor preparation which is water-insoluble but has not inflammation-, fever- and pain-causing properties, maintaining a good destructive action on tumor cells.

According to the invention achieved from intensive studies carried out by the present inventors, an anti-tumor preparation without the above-mentioned drawbacks is produced by lysing the cells of hemolytic streptococci with a lytic enzyme, and collecting a water-insoluble fraction from the lysate. Thus, the water-insoluble fraction comprises protoplast membrane of a hemolytic streptococcus.

The present invention will be explained hereinafter in more detail. The hemolytic streptococci usable in the invention are any ones as long as their cells have an anti-tumor activity, although the present invention is explained herein by the use of Streptococcus hemolyticus strains such as Streptococcus hemolyticus Su (ATCC No. 21060), Streptococcus hemolyticus Sv (ATCC No. 21059), Streptococcus hemolyticus C203S (ATCC No. 21546), Streptococcus hemolyticus S-43 (ATCC No. 21547), and Streptococcus hemolyticus Blackmore (ATCC No. 21548). The cultivation of hemolytic streptococci is carried out by conventional methods in a medium such as meat-infusion broth and yeast extract medium. The cultivated living cells are collected and ordinarily washed with physiological saline solution or an appropriate buffer solution.

As the lytic enzyme used in the present invention, there are mentioned those produced by bacteria and actinomycetes, or prepared from the lysate of bacteriophage-infected streptococci. For example, the following enzymes are recommended.

(1) A lytic enzyme prepared from the lysate of Bacteriophage ATCC No. 21597–b-infected Group C Streptococcus sp. (ATCC No. 21597).

(2) Enzyme L–11 produced by Flavobacterium sp. (ATCC No. 21044).

(3) A lytic enzyme produced by Streptomyces albus IFO 3422 (ATCC No. 3381).

(4) A lytic enbyme produced by Streptomyces rutgersensis IAM 0085 (ATCC No. 3350).

(5) A lytic enzyme produced by Streptomyces griseus.

The preparation of lytic enzymes is well known in the literature, and in the practice of the invention these preparation methods are used. For example, a lytic enzyme can be prepared from the lysate of bacteriophage-infected bacteria according to a method described in the Journal of Biochemistry, vol. 57, p. 67 (1965). A lytic enzyme can be prepared from the cultivation broth of a microorganism according to a process described in the Biochemistry, vol. 5, p. 2764 (1966).

When the enzyme contains protease, which would have a bad effect against anti-tumor activity, it is preferably purified to be free from protease before use.

The lytic treatment of the cells of hemolytic streptococci with the enzyme is effected in a medium in which the cells are suspended. As the medium, a hypertonic solution of sodium citrate, sodium succinate or sucrose is preferably used, although a salt solution including other suitable buffer solution is also usable. The pH of the medium may vary depending upon the enzyme used, and is preferably in a range of 6 to 8 especially for keeping anti-tumor substances stable during the treatment. The temperature and time varies also depending upon the kind of enzyme used, and they are in general 10°–40° C. in temperature and 10–120 minutes in period, preferably 10°–30° C. and 10–60 minutes, respectively, especially in order to prevent the reduction of the activity of the active substances.

After the completion of lysis, the active substances are separated as a water-insoluble matter from the lysate by, for example, centrifugation, and washed with a suitable liquid such as physiological saline solution, appropriate buffer solution or distilled water.

The thus obtained anti-tumor substances are found to be the protoplast membrane fraction, which is resistant to lysis, of hemolytic streptococci, by electron microscopic observation at an amplifying rate of 60,000 (the photograph is attached). The fraction contains neither cell wall nor cytoplasm in which side effect-causing substances are contained, and has no drawbacks such as inflammation-, fever- and pain-causing properties seen in the preparation of prior art. The anti-tumor activity thereof is far superior to those of water-soluble active substances in the preparation of prior art. The properties and activity of the substances will be substantiated in examples and tests in the specification.

The anti-tumor fraction thus obtained is administered in the form of a suspension in a suitable physiologically acceptable medium such as Bernheimer's basal medium and physiological saline solution.

As the active fraction is relatively unstable as it is in the state of suspension even when stored in a refrigerator, it is subjected to freeze-drying to form a dry preparation. Its suspension in the above medium is preferably subjected to freeze-drying to obtain a preparation which can be readily used by adding required distilled water. A dry preparation more stable can be prepared by freeze-drying a suspension containing an amino acid or a sugar as a stabilizer in a quantity of 1 to 50 times the dry weight of the active fraction. As the amino acid, there are mentioned alanine, aspartic acid, citrulline cysteine, glutamic acid, glycine, histidine, hydroxyproline, isoleucine, leucine, ornithine, proline, serine, threonine, valine, etc. The sugar includes sucrose, raffinose, lactose, dextran, soluble starch, etc.

The following examples and tests will more particularly explain the present invention which is not construed to be limited thereto. Unless otherwise noted, the percentages referred to are by weight by volume.

"BBM" referred to herein is the Bernheimer's basal medium whose composition is 675 mg of maltose, 6 ml. of 20% aqueous solution of potassium dihydrogen phosphate adjusted to pH 6.9–7.0 with sodium hydroxide, 12 ml. of 2% aqueous solution of magnesium sulfate heptahydrate and 66 ml. of distilled water.

EXAMPLE 1

Streptococcus hemolyticus Su strain (ATCC No. 21060, nearly avirulent strain) was cultivated in a meat-infusion broth at 37° C. for 24 hours. 100 ml. of the culture was inoculated into 2 l. of a 5% yeast extract medium which has been prepared by dissolving 100 g. of a yeast extract (sold by Ebios Yakuhin Co., Ltd.) in 1.5 l. of distilled water, adjusting the pH of the solution at pH 7.4 with a sodium hydroxide solution, heating at 100° C. for 60 minutes and cooling, filtering the cooled solution, adding water to the filtrate to be 2 l., and sterilizing for 10 minutes under steam at 1 kg./cm.² (gauge), and cultivation was effected at 37° C. for 20 hours. The resulting broth was chilled with ice and centrifuged to obtain the cells, which were washed twice with a cold physiological saline solution. The washed cells were suspended in BBM and the absorbance was adjusted to 8.00 660 m$\mu$. The absorbance shows that the suspension contains 5 mg. of the cells in terms of dry cell weight in ml. of the suspension which amounted to 95 ml. Twenty ml. of the cell suspension was centrifuged while cooling and the separated cells were suspended in 20 ml. of 0.5 M aqueous sodium citrate solution prepared by mixing 5 parts by volume of 1 M aqueous sodium citrate solution, one part by volume of 0.2 M phosphate buffer solution (pH 7.2), one part by volume of 2% aqueous sodium thioglycolate solution and 3 parts by volume of distilled water. To the suspension was added 80 mg. of a lytic enzyme prepared from the lysate of Bacteriophage ATCC No. 21597–b-infected Group C Streptococcus sp. ATCC No. 21597, according to the method described in the Journal of Biochemistry, vol. 57, p. 67 (1965). The suspension was kept at 25° C. for 30 minutes, ice-cooled and subjected to centrifugation at 10,000$\times g$ for 30 minutes to separate precipitates. The precipitates were washed twice with a cold saline solution and suspended in 20 ml. of BBM containing potassium salt of penicillin G in a concentration of 27,000 IU/ml. Thus produced anti-tumor preparation contains insoluble active substances in an amount of 0.88 in terms of absorbance at 660 m$\mu$.

EXAMPLE 2

Example 1 was repeated with the exception of the replacement of Streptococcus hemolyticus Sv strain (ATCC No. 21059) for Streptococcus hemolytics Su strain, and an anti-tumor preparation containing active substances in an amount of 0.90 in terms of absorbance at 660 m$\mu$ was obtained.

EXAMPLE 3

Example 1 was repeated with the exception of the replacement of Streptococcus hemolyticus C203S strain (ATCC No. 21546) for Streptococcus hemolyticus Su strain, and an anti-tumor preparation having an absorbance of 0.96 at 660 m$\mu$ was obtained.

EXAMPLE 4

Example 1 was repeated with the exception of the use of Streptococcus hemolyticus S–43 strain (ATCC No. 21547) as hemolytic streptococci, and an anti-tumor preparation having an absorbance of 0.92 at 660 m$\mu$ was obtained.

EXAMPE 5

Example 1 was repeated with the exception of the use of Streptococcus hemolyticus Blackmore (ATCC No. 21548) as hemolytic streptococci, and an anti-tumor preparation having an absorbance of 0.95 at 660 m$\mu$ was obtained.

EXAMPLE 6

Cultivated cells of Streptococcus hemolyticus Su strain (ATCC No. 21060, nearly avirulent strain) were prepared by the same manner as described in Example 1. The cells were suspended in BBM and the absorbance was adjusted to 9.20 at 660 m$\mu$, which corresponded to a dry cell concentration of 6 mg./ml. Forty ml. of the suspension was added with 8 ml. of a physiological saline solution containing potassium salt of penicillin G in a concentration of $1.6 \times 10^5$ IU/ml., and incubated at 37° C. for 20 minutes. Then the suspension was subjected to heat-treatment at 45° C. for 30 minutes and immediately cooled. The resulting suspension corresponds to PCB–45 which is referred to previously. The PCB–45 contained streptococcal cells in an amount of 5 mg./ml. in terms of dry cells (absorbance: 8.00 at 660 m$\mu$).

The cells were separated from 20 ml. of the suspension by means of centrifugation, and suspended in 20 ml. of 0.5 M sodium citrate solution. To the resulting suspension was added 80 mg. of a lytic enzyme obtained from a lysate of Bacteriophage (ATCC No. 21597–b)-infected Group C Streptococcus sp. ATCC No. 21597. The suspension is kept at 25° C. for 30 minutes, chilled with ice and subjected to centrifugation to separate precipitates. The subsequent procedures applied to the precipitates were same as in Example 1. An anti-tumor preparation having an absorbance of 1.20 at 660 m$\mu$ was obtained.

EXAMPLE 7

To 20 ml. of the PCB–45 prepared in Example 6 was added 80 mg. of a lytic enzyme obtained from a lysate of Bacteriophage (ATCC No. 21597–b)-infected Group C Streptococcus sp. ATCC No. 21597. An anti-tumor preparation having an absorbance of 0.98 at 660 m$\mu$ was obtained by the subsequent procedures same as in Example 1.

EXAMPLE 8

Twenty ml. of PCB–45 prepared by the same procedure as in Example 6 was subjected to centrifugation. The separated cells were suspended in 20 ml. of 0.5 M aqueous sodium citrate solution. The suspension was added with 160 mg. of partially purified lytic enzyme obtained from a cultivation broth of *Streptomyces albus* IFO 3422 (ATCC No. 3381) [peptidase had been removed in accordance with a method described in the Biochemistry, vol. 5, p. 2764 (1964)], and was kept at 37° C. for 40 minutes, ice-cooled and subjected to centrifugation to separate precipitates.

An anti-tumor preparation having an absorbance of 1.05 at 660 m$\mu$ was prepared according to the procedures same as applied to the precipitates in Example 1.

EXAMPLE 9

To the anti-tumor preparation obtained in Example 1 was added an equal volume of 1% aqueous DL-methionine solution, and each 2 ml. of the mixture was placed separately in vials. The vials were quenched to −30° C. for 2 hours, and then subjected to freeze-drying under a reduced pressure of 0.01 mm. Hg for 20 hours while keeping the temperature of the content so as not to exceed 20° C. After dried, the vials were sealed tightly immediately after the reduced pressure was returned to atmospheric pressure with dried air. A dry anti-tumor preparation was thus obtained.

EXAMPLE 10

The precipitates obtained by the same procedures as in Example 6 were suspended in 20 ml. of BBM not containing penicillin. The resulting suspension was added with an equal volume of 1% aqueous DL-methionine solution, and subjected to freeze-drying according to the same procedures as described in Example 9 to obtain a dry anti-tumor preparation.

EXAMPLE 11

Example 10 was repeated with the exception of the use of L-arginine for DL-methionine. A dry anti-tumor preparation was obtained.

EXAMPLE 12

Example 10 was repeated with the exception of the use of sucrose for DL-methionine, and a dry anti-tumor preparation was obtained.

For comparison of the anti-tumor activity, inflammation-causing property and pain-giving property of the preparation according to the present invention with those of prior art, some preparations according to prior art are prepared in the following referential examples.

REFERENTIAL EXAMPLE 1

Cells of *Streptococcus hemolyticus* Su strain (ATCC No. 21060) was suspended in BBM containing penicillin G potassium salt in a concentration of 27,000 IU/ml. The suspension was incubated at 37° C. for 20 minutes and then subjected to heat-treatment at 45° C. for 30 minutes. PCB–45 thus obtained had an absorbance of 8.00 at 660 m$\mu$ (see Example 6).

REFERENTIAL EXAMPLE 2

Referential Example 1 was repeated with the exception of the use of cephalosporin C (cephaloridine) for penicillin. CEB–45 thus obtained had an absorbance of 8.00 at 660 m$\mu$.

REFERENTIAL EXAMPLE 3

Referential Example 1 was repeated with the exception of the use of cycloserine for penicillin. CYB–45 thus obtained had an absorbance of 8.00 at 660 m$\mu$.

REFERENTIAL EXAMPLE 4

Cells of *Streptococcus hemolyticus* Su strain (ATCC No. 21060) were disrupted in a motor with alumina powder, and extracted with a phosphate buffer solution (pH 7.2). Cold acetone was slowly added to the extract to obtain precipitates. An anti-tumor preparation was obtained by dissolving the dried precipitates in distilled water.

REFERENTIAL EXAMPLE 5

An anti-tumor preparation was obtained by collecting the supernatant of the lysate of *Streptococcus hemolyticus* Su strain (ATCC No. 21060) according to the procedure described in Example 1.

REFERENTIAL EXAMPLE 6

Cells of *Streptococcus hemolyticus* Su strain (ATCC No. 21060) were suspended in distilled water, and disrupted by treating with glass powder in a Braun cell homogenizer (Braun Co., Germany). The supernatant was collected by centrifuging the resultant mixture, and dialyzed in a cellophane tube against aqueous ammonium sulfate solution. A fraction precipitating between 50 and 80% saturation of ammonium sulfate was collected by centrifugation. The fraction was subjected to dialysis against distilled water to obtain an anti-tumor preparation.

TEST 1

This test deals with the inflammation-causing property of the preparations of the present invention and prior art for comparison.

Test method

The preparations prepared in some of examples and referential examples described already, were each injected subcutaneously into the back of ddY strain male mice (average body weight: about 28.5 g.) in the amount shown in Table 1. After three hours, 0.5% Evans blue solution was injected into the same position. After thirty minutes, the mice were killed, and the skins were flayed and inspected for the leakage of the pigment.

Sample

Sample I: The preparation of Example 1
Sample II: The preparation of Example 2
Sample III: The preparation of Example 3
Sample IV: The preparation of Example 4
Sample V: The preparation of Example 5
Sample VI: The preparation of Example 6
Sample VII: The preparation of Example 8
Sample VIII: The preparation of Referential Example 1
Sample IX: The preparation of Referential Example 2
Sample X: The preparation of Referential Example 3
Sample XI: The preparation of Referential Example 4
Sample XI: The preparation of Referential Example 4
Sample XII: The preparation of Referential Example 5
Sample XIII: The preparation of Referential Example 6.

Result

The results obtained are shown in Table 1.

TABLE 1

| Sample | Dose administered (mcg.) | Number of mouse [1] |
|---|---|---|
| This invention: | | |
| I | 30 | 0/5 |
| II | 30 | 0/5 |
| III | 30 | 0/5 |
| IV | 30 | 0/5 |
| V | 30 | 0/5 |
| VI | 30 | 0/5 |
| VII | 30 | 0/5 |
| Prior art: | | |
| VIII | 100 | 5/5 |
| IX | 100 | 5/5 |
| X | 100 | 5/5 |
| XI | 70 | 5/5 |
| XII | 50 | 5/5 |
| XIII | 20 | 5/5 |

[1] Positive in pigment leakage/number of mouse tested.

NOTE.—The doses indicated are expressed in terms of dry weight. In case of samples I–VII and XI–XIII, the doses are amounts of active substances obtained from 100 mcg. (dry weight) of streptococcal cells, and in case of samples VIII–X, they are amounts of streptococcal cells.

TEST 2

This test deals with the pyrogenic property.

Test method and sample

The preparations same as used in test 1 were each injected intravenously into the ear of rabbits (Japanese White strain), and the rectum temperature was measured at an interval of 1 hour till 12 hours after the injection.

Result

The results obtained are shown in Table 2 in which it is noted that the increase of the temperature in case of samples I–VII was at most 0.5° C., while those of samples VIII–XIII were above 1° C.

TABLE 2

| Sample | Dose administered (mcg.) | Time lapsed after administration (hour) | | | | |
|---|---|---|---|---|---|---|
| | | 0 | 1 | 4 | 8 | 12 |
| This invention: | | | | | | |
| I | 150 | 38.8 | 38.9 | 38.9 | 39.3 | 39.1 |
| | 300 | 38.8 | 38.7 | 39.2 | 39.2 | 39.1 |
| | 750 | 39.3 | 39.6 | 39.5 | 39.4 | 39.3 |
| | 1,500 | 39.0 | 39.5 | 39.5 | 39.4 | 39.3 |
| II | 150 | 38.8 | 38.9 | 38.8 | 38.9 | 38.8 |
| III | 150 | 39.0 | 39.0 | 38.9 | 39.2 | 39.0 |
| IV | 150 | 38.9 | 39.1 | 39.1 | 39.2 | 39.2 |
| V | 150 | 39.1 | 39.1 | 39.4 | 39.4 | 39.3 |
| VI | 150 | 39.3 | 39.2 | 39.3 | 39.1 | 39.1 |
| VII | 150 | 38.9 | 38.9 | 39.0 | 39.0 | 39.2 |
| Prior art: | | | | | | |
| VIII | 500 | 38.8 | 38.8 | 40.7 | 40.1 | 38.9 |
| IX | 500 | 39.0 | 38.9 | 41.0 | 39.9 | 39.6 |
| X | 500 | 39.0 | 38.9 | 40.9 | 40.2 | 39.2 |
| XI | 350 | 38.6 | 38.6 | 40.3 | 38.9 | 38.7 |
| XII | 250 | 39.2 | 39.2 | 41.1 | 40.1 | 39.8 |
| XIII | 100 | 39.1 | 39.1 | 40.7 | 39.3 | 39.3 |

NOTE.—The doses indicated are expressed in terms of dry weight. In case of Sample I, the doses are amounts of active substances obtained from 500, 1,000, 2,500 and 5,000 mcg., respectively, (dry weight) of streptococcal cells, and in case of Samples II–VII and XI–XIII, from 500 mcg. (dry weight) of cells. In case of Samples VIII–X, the doses are amounts of streptoccoccal cells.

TEST 3

This test deals with the pain-causing property.

The same preparations as used in test 1 were each injected intraperitoneally into ddY strain five weeks old male mice (average body weight: 20.6 g., 5 mice each group).

The behaviors of the mice were carefully observed for one hour after the injection. The mice administered with the preparations of the invention showed no abnormal behavior, but those for comparison showed in various extents so called writhing syndrome such as twisting the body while thinning the abdomen and occasionally stretching the hind legs.

TEST 4

This test deals with the anti-tumor activity.

Ehrlich ascites carcinoma cells were inoculated intraperitoneally into ddY strain male mice, five weeks old, in a quantity of $10^6$ cells per mouse (10 mice/group). Samples I–III, V, VIII–XIII as used in test 1 and sample XIV which is the preparation of Example 10 were each injected intraperitoneally into the mice after 24 hours from the inoculation, in 0.1 ml. per mouse, once a day for 4 days.

After 40 days, the anti-tumor activity was estimated by the number of survivals in each group. As the control group, only BBM containing penicillin G potassium (27,000 IU/ml.) was injected. The results are shown in Table 3.

TABLE 3

| Sample | Dose administered (mcg.) | Survivals/ mice tested (number) |
|---|---|---|
| This invention: | | |
| I | 75 | 7/10 |
| II | 75 | 6/10 |
| III | 75 | 6/10 |
| V | 75 | 5/10 |
| XIV | 75 | 7/10 |
| Prior art: | | |
| VIII | 250 | 10/10 |
| IX | 250 | 10/10 |
| X | 250 | 10/10 |
| XI | 175 | 1/10 |
| XII | 125 | 1/10 |
| XIII | 50 | 3/10 |
| Control (BBM containing penicillin) | | 0/10 |

NOTE.—Doses indicated are expressed in terms of dry weight. In case of Samples I–III, V and XI–XIV, the doses are amounts of active substances obtained from 250 mcg. (dry weight) of streptococcal cells, and in case of Samples VIII–X, they are amounts of streptococcal cells.

What is claimed is:

1. A process for producing anti-tumor substances comprising the steps of:

lysing the cells of hemolytic streptococci having anti-tumor activity with a lytic enzyme which can lyse streptococci cells and has no adverse effect on anti-tumor activity;

collecting water insoluble substances from the lysate; and washing the water insoluble substances to yield a fraction consisting essentially of protoplast membrane.

2. A process according to claim 1, wherein the hemolytic streptococci is selected from the group consisting of Streptococcus hemolyticus Su strain (ATCC No. 21060), Streptococcus hemolyticus Sv strain (ATCC No. 21059), Streptococcus hemolyticus 203S strain (ATCC No. 21546), Streptococcus hemolyticus S–43 strain (ATCC No. 21547) and Streptococcus hemolyticus Blackmore strain (ATCC No. 21548).

3. A process according to claim 1, wherein the lytic enzyme is one produced from the culture broth of a microorganism selected from the group consisting of Streptomyces albus IFO 3422 (ATCC No. 3381), Streptomyces rutgersensis IAM 0085 (ATCC No. 3350), Streptomyces griseus.

4. A process according to claim 1, wherein the lytic enzyme is enzyme L–11 produced by Flavobacterium sp. (ATCC No. 21044).

5. A process according to claim 1, wherein the lytic enzyme is one obtained from the lysate of Group C Streptococcus sp. (ATCC. No. 21597) infected with Bacteriophage ATCC No. 21597-b.

6. A process according to claim 1, wherein the lysis is effected in a hypertonic aqueous medium containing sodium citrate, sodium succinate or sucrose.

7. A process according to claim 1, wherein the lysis is effected at a temperature of 10° to 40° C. for 10 to 120 minutes.

8. The product produced according to the process of claim 1.

9. A process in accordance with claim 1 wherein said washing step is accomplished with physiological saline solution or distilled water.

10. A process for producing anti-tumor substances comprising the steps of:

lysing the cells of hemolytic streptococci having anti-tumor activity with a lytic enzyme selected from the group consisting of
(1) lytic enzyme prepared from the lysate of Bacteriophage ATCC No. 21597–b-infected Group C Streptococcus sp. (ATCC No. 21597),
(2) Enzyme L–11 produced by Flavobacterium sp. (ATCC No. 21044),
(3) lytic enzyme produced by *Streptomyces albus* IFO 3422 (ATCC No. 3381),
(4) lytic enzyme produced by *Streptomyces rutgersensis* IAM 0085 (ATCC No. 3350), and
(5) lytic enzyme produced by *Streptomyces griseus;* collecting water insoluble substances from the lysate; and washing the water insoluble substances to yield a fraction consisting essentially of protoplast membrane.

References Cited
FOREIGN PATENTS
1,163,865   9/1969   Great Britain _____ 195—96

OTHER REFERENCES
K. Kato et al.: Biken Journal 5, pp. 155–179 (1962).

ALVIN E. TANENHOLTZ, Primary Examiner

T. G. WISEMAN, Assistant Examiner

U.S. Cl. X.R.

195—2, 4, 96